(12) United States Patent
Burke et al.

(10) Patent No.: US 11,292,338 B2
(45) Date of Patent: Apr. 5, 2022

(54) PEDAL EMULATOR FOR A MOTOR VEHICLE

(71) Applicant: HELLA GmbH & Co. KGaA, Lippstadt (DE)

(72) Inventors: Dennis Mark Burke, Canton, MI (US); Kenneth James Nadeau, Ann Arbor, MI (US); Werner Austermeier, Schloss Holte-Stukenbrock (DE); Henning Irle, Lippstadt (DE); Marcus Irrgang, Soest (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 136 days.

(21) Appl. No.: 16/490,631

(22) PCT Filed: Feb. 28, 2018

(86) PCT No.: PCT/IB2018/051278
§ 371 (c)(1),
(2) Date: Sep. 3, 2019

(87) PCT Pub. No.: WO2018/158703
PCT Pub. Date: Sep. 7, 2018

(65) Prior Publication Data
US 2020/0001711 A1     Jan. 2, 2020

Related U.S. Application Data

(60) Provisional application No. 62/587,067, filed on Nov. 16, 2017.

(30) Foreign Application Priority Data

Mar. 1, 2017   (DE) .................. 102017104278.4

(51) Int. Cl.
G05G 5/03       (2008.04)
B60K 23/02      (2006.01)
(Continued)

(52) U.S. Cl.
CPC ............ B60K 23/02 (2013.01); B60K 26/021 (2013.01); G05G 5/03 (2013.01); G05G 5/05 (2013.01);
(Continued)

(58) Field of Classification Search
CPC ...... G05G 5/05; B60K 26/021; B60T 8/4081; B60T 8/4086; B60T 8/409; F16F 3/00
See application file for complete search history.

(56) References Cited

U.S. PATENT DOCUMENTS 6,367,886 B1   4/2002  Shaw
8,449,047 B2 * 5/2013  Drumm ................. B60T 8/4077
                                                  303/115.4
(Continued)

FOREIGN PATENT DOCUMENTS

DE         10335598 A1      2/2005
DE     102010027924 A1 *   10/2011  ............... G05G 5/03

OTHER PUBLICATIONS

"Hall effect," Wikipedia Page, dated by Wayback Machine to Mar. 2, 2016, url:<https://web.archive.org/web/20160302044800/https://en.wikipedia.org/wiki/Hall_effect>.*
(Continued)

Primary Examiner — Richard W Ridley
Assistant Examiner — Brian J McGovern
(74) Attorney, Agent, or Firm — Warner Norcross + Judd LLP

(57) ABSTRACT

A pedal emulator (20, 100) is provided. The pedal emulator includes an emulator piston (28, 102) coupled to a damper
(Continued)

(46, D1) that is contained within a housing (22, 104). The damper is surrounded by first (34, S1) and second (38, S2) springs that are carried by a lower spring seat (114), the lower spring seat being upwardly biased by a third spring (S3), for example a wave spring. The first and second springs and the third spring cooperate to provide a counter-force that is tailored to the desired feel of the pedal. First and second sensors measure travel (72, 74) and force in response to downward compression of the emulator piston, and the damper provides hysteresis upon return travel of the emulator piston. A method comprising: providing a brake pedal emulator (100) including an emulator piston (102), the emulator piston (102) being operatively coupled to a brake pedal, wherein the brake pedal emulator (100) is adapted to provide a first force response during a first portion of travel of the emulator piston (102) and a second force response during a second portion of travel of the emulator piston (102); detecting a sequence of actuations of the brake pedal using the brake pedal emulator (100) for conversion into a selected driver input command; and providing vibratory feedback to the brake pedal using a haptic actuator, the vibratory feedback being in response to the selection of a driver input command.

16 Claims, 16 Drawing Sheets

(51) Int. Cl.
  *B60K 26/02*  (2006.01)
  *G05G 5/05*   (2006.01)
  *B60T 7/04*   (2006.01)
  *B60T 8/40*   (2006.01)
  *F16F 3/00*   (2006.01)

(52) U.S. Cl.
  CPC ............. *B60T 7/042* (2013.01); *B60T 8/4086* (2013.01); *B60T 2220/04* (2013.01); *B60T 2270/82* (2013.01); *F16F 3/00* (2013.01)

(56) References Cited

U.S. PATENT DOCUMENTS

| | | | |
|---|---|---|---|
| 9,043,086 B1* | 5/2015 | Gauthier | B60L 50/61 701/36 |
| 10,906,514 B1* | 2/2021 | Kim | G05G 1/40 |
| 2002/0100341 A1* | 8/2002 | Kumamoto | B60K 26/021 74/512 |
| 2005/0005354 A1* | 1/2005 | Gladney | B21F 35/00 5/256 |
| 2008/0010985 A1* | 1/2008 | Miyazaki | B60T 8/4081 60/565 |
| 2010/0083789 A1* | 4/2010 | Osawa | G05G 5/03 74/513 |
| 2010/0294074 A1* | 11/2010 | Muraji | B60K 26/021 74/514 |
| 2014/0000254 A1* | 1/2014 | Murayama | B60T 8/4081 60/533 |
| 2014/0230429 A1 | 8/2014 | Kim | |
| 2018/0274998 A1* | 9/2018 | Sumi | G01L 1/20 |
| 2019/0126898 A1* | 5/2019 | Anderson | B60T 8/3255 |

OTHER PUBLICATIONS

"Wave spring," Wikipedia Page, dated by Wayback Machine to Aug. 2, 2016, url:<https://web.archive.org/web/20160802112640/https://en.wikipedia.org/wiki/Wave_spring>.*
"Series and parallel springs," Wikipedia page, url:<https://en.wikipedia.org/wiki/Series_and_parallel_springs#:~:text=In%20mechanics%2C%20two%20or%20more,Series>.*
Machine Translation of DE 10 2010 027 924.*
International Search Report and Written Opinion of International Application No. PCT/IB2018/051278 (WO2018/158703) completed on Jul. 23, 2018.

* cited by examiner

PEDAL EMULATOR FOR A MOTOR VEHICLE

CROSS-REFERENCE TO RELATED APPLICATIONS

This application claims the benefit of German Patent Application 10 2017 104 278.4, filed Mar. 1, 2017, and U.S. Provisional Patent Application No. 62/587,067, filed Nov. 16, 2017, the disclosures of which are incorporated by reference in their entirety.

FIELD OF THE INVENTION

The present invention relates to pedal emulators for motor vehicles, and in particular, pedal emulators for providing a counter-force to a pedal of a brake-by-wire system and other applications, including accelerator pedals and clutch pedals.

BACKGROUND OF THE INVENTION

Motor vehicles can include brake-by-wire systems, in which a braking demand is determined electronically at the brake pedal. Brake-by-wire systems offer a number of advantages over conventional brake systems, including weight advantages and reduction of vehicle packaging space, and can be readily integrated into anti-lock braking systems and regenerative braking systems.

Some brake-by-wire systems provide a brake pedal feel that differs from the brake pedal feel found in conventional brake systems. For example, conventional brake systems provide a counter-force that typically varies as the brake pedal is depressed due to a non-linear reaction force in the brake master cylinder, among other factors.

Accordingly, brake pedal emulators have been developed for brake-by-wire systems to simulate a desired counter-force and replicate the feel of a conventional braking system. Existing brake pedal emulators typically include a spring piston and/or a hydraulic piston that gradually opposes depression of the brake pedal. Despite the advantages of existing brake pedal emulators, there remains a continued need for an improved pedal emulator for brake pedals, accelerator pedals, and clutch pedals. In particular, there remains a continued need for an improved pedal emulator that provides a desired counter-force and hysteresis in response to depression of a pedal, optionally with efficiencies in mass and packaging over existing systems.

SUMMARY OF THE INVENTION

In accordance with one embodiment of the invention, a pedal emulator for a motor vehicle is provided. The pedal emulator includes an outer housing for mounting the pedal emulator to a footwell, a control rod for mounting the pedal emulator to a pedal, and a parallel circuit therebetween, the parallel circuit including a first spring in series with a second spring as a first series circuit, the parallel circuit further including a damper connected in parallel with the first series circuit and including a hysteresis generating system. The pedal emulator is adaptable for use with different types of pedals of a motor vehicle without changes in its basic structure. For example, the very different haptic feedback of conventional brake pedals, accelerator pedals, and clutch pedals can be simulated in their respective complexity using the pedal emulator of the current embodiments. Using the damper of the pedal emulator, a speed dependency of the simulated haptic feedback is realized, since the damper acts as a function of the actuation speed of a pedal equipped with the pedal emulator of the current embodiments.

In one embodiment, the parallel circuit includes a second series circuit of at least two springs. In this way, the adjustment of the pedal emulator and the imitation of complex haptic feedback is further improved. In addition, by the parallel connection of a first series circuit and a second series circuit, redundancy is generated, which ensures, for example, in a malfunction in one of the series circuits, that a pedal equipped with the pedal emulator in case of non-actuation by a user is moved in the direction of the rest position.

The springs of the first series circuit and the second series circuit include a type, spring constant, dimension, material, and arrangement that are freely selectable within wide appropriate limits. The springs of the first series circuit and the second series circuit expediently bias the control rod apart from the base of the outer housing in a rest position of the pedal emulator. As a result, any undesired slip in the operation of the pedal emulator according to the embodiment is effectively prevented in a structurally simple manner.

Further, the springs of the first series circuit and the second series circuit at least partially have a linear spring characteristic and/or a progressive spring characteristic. Springs with the aforementioned spring characteristics are particularly well suited to simulate the complex haptic feedback of conventional pedals of a motor vehicle. Each spring is disposed between two mutually corresponding bearing parts and is arranged with a limited amount of travel. The two bearing parts are formed as two pistons or as a piston and a housing part. The bearing parts are also referred to herein as "spring seats," which carry the ends of the springs.

The present embodiment can provide a spring with a progressive spring characteristic arranged between mutually corresponding bearing parts. In this way, transitions from one portion of travel of the control rod (relative to the base of the outer housing) to a subsequent portion of travel of the control rod can be made more uniform.

The hysteresis generation system is freely selectable in terms of type, material, dimension and arrangement, within suitable limits. In the current embodiment, the hysteresis generating system is a friction system. The friction system includes at least two friction partners with mutually corresponding friction surfaces sliding over each other. Frictional hysteresis is manifested for example in the slowed return of the control rod. Friction systems are structurally easy to implement and easily adjustable to the particular requirements of the individual case.

In the current embodiments, the friction system is biased by the first series circuit, the second series circuit, or the first and second series circuits, such that the mutually corresponding friction surfaces are pressed against one another. This ensures that the friction partners of the friction system generate in each position of the pedal emulator a defined, predetermined friction. In addition, the mutually corresponding friction surfaces are arranged parallel to the direction of the spring force of the first series circuit and/or the second series circuit, wherein the spring force is deflected radially outward by 90°. In this way, a compact construction of the pedal emulator according to the current embodiment is made possible.

The pedal emulator according to one embodiment includes at least one displacement sensor for detecting the relative movement between the outer housing and the control rod. As a result, the pedal emulator is simultaneously designed as a displacement sensor for detecting the pedal travel of the pedal equipped with the control rod. Additional components and thus additional installation space for the sensor system can thus be saved.

The pedal emulator according to one embodiment includes at least one force sensor to detect the force applied to the control rod. In this way, the pedal emulator is simultaneously a force sensor for detecting the force exerted on the pedal equipped with the pedal emulator of this embodiment. Thus, a further saving of components and space is feasible.

The displacement sensor and/or force sensor is freely selectable according to type, dimension, material, and arrangement, within suitable limits. Advantageously, the force sensor has at least one sensor spring, wherein the sensor spring is arranged in series with the parallel circuit. As a result, an additional adjustment of the pedal emulator according to an embodiment of the invention is created in order to mimic each different complex haptic feedback In accordance with another embodiment of the invention, a brake pedal emulator for a brake-by-wire system is provided. The brake pedal emulator includes an emulator piston coupled to an internal damper. The internal damper is surrounded by first and second springs that are carried by a lower spring seat, the lower spring seat being upwardly biased by a third spring, for example a wave spring. The first, second, and third springs cooperate to provide a counter-force to the emulator piston. The counter-force includes multiple stages that allow for tailoring to a desired feel of the brake pedal. Further embodiments can optionally include a fourth spring, for example a resilient bumper. The internal damper provides a desired elastic hysteresis during return travel of the emulator piston, and first and second non-contact sensors measure position and force through a full range of motion of the emulator piston.

In another embodiment, a method for providing vibratory feedback to the brake pedal is provided. The vibratory feedback can relate to a vehicle operating state. For example, a haptic actuator can provide vibratory feedback in response to activation of the motor, for example an electric motor. The haptic actuator is incorporated into the brake pedal emulator in some embodiments, while in other embodiments the haptic actuator is external to the brake pedal emulator. In addition, the brake pedal emulator can be used to receive information from the driver, separate and apart from a desired braking demand. For example, multiple actuations of the brake pedal during a vehicle non-operating state can be converted into an engine/motor start command, or to a transmission shift command. Acknowledgment of these commands can be confirmed with a haptic vibration of the brake pedal.

These and other features and advantages of the present invention will become apparent from the following description of the current embodiments, when viewed in accordance with the accompanying drawings and appended claims.

DETAILED DESCRIPTION OF THE CURRENT EMBODIMENTS

Figure 1:
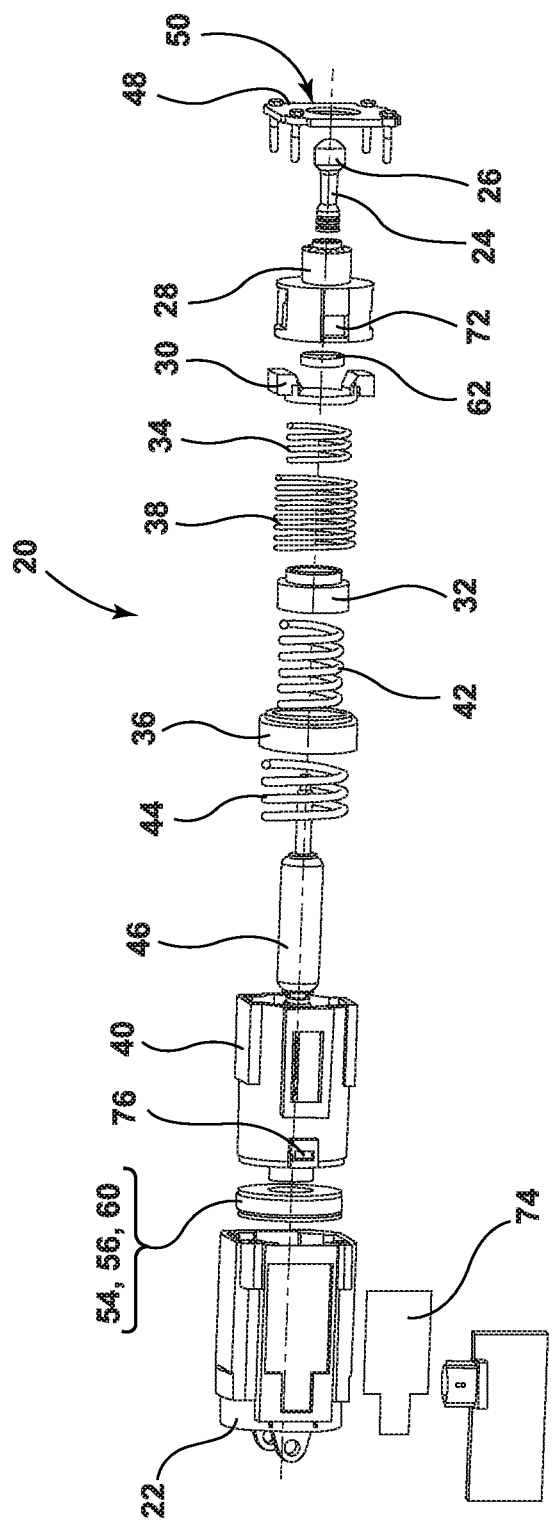
FIG. 1 is an exploded view of a pedal emulator in accordance with a first embodiment.

Referring to FIGS. 1-5, a pedal emulator in accordance with one embodiment is illustrated and generally designated 20. The pedal emulator 20 includes an outer housing 22 for mounting the pedal emulator 20 to a footwell panel and includes a control rod 24 with a ball head 26 for mounting the pedal emulator 20 to a pedal. The control rod 24 is attached to a first piston 28. The first piston 28 engages with a first bearing part 30 functioning as a friction element. Between the first bearing part 30 and a second piston 32 that serves as a bearing member, is disposed a first spring 34, and between the first bearing part 30 and a third piston 36 is disposed a second spring 38. The first spring 34 and the second spring 38 are arranged in parallel.

Figure 2:
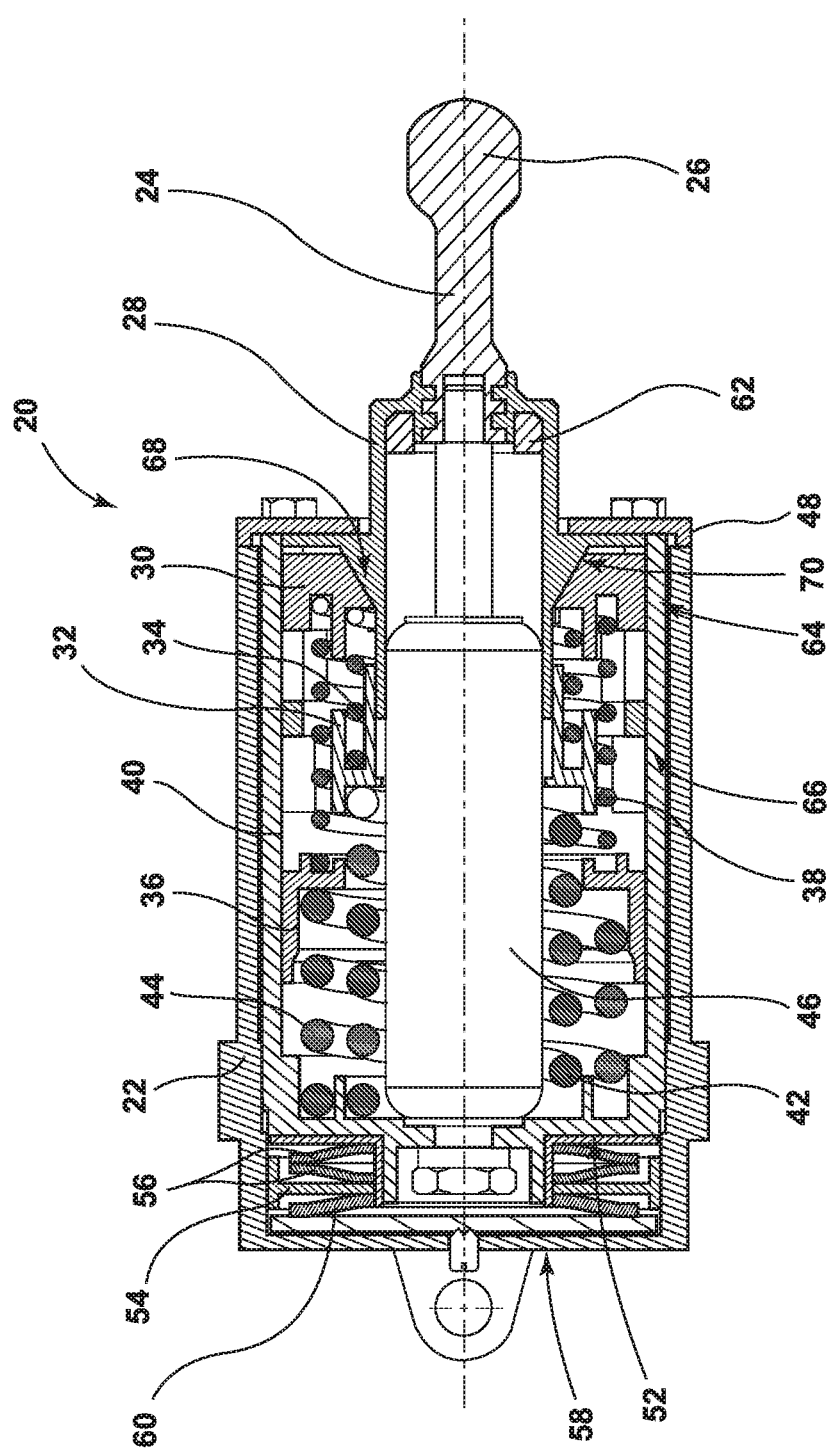
FIG. 2 is a cross-section of the pedal emulator of FIG. 1 in a rest position.

Between the second piston 32 and the closed end of the inner housing 40 is disposed a third spring 42, and between the third piston 36 and the closed end of the inner housing 40 is disposed a fourth spring 44. The springs 34, 38, 42, 44 are formed as coil springs. The pedal emulator 20 also includes a damper 46 connected to the control rod 24 and the inner housing 40. The inner housing 40 is nested within the outer housing 22 as shown in FIG. 2. The outer housing 22 and the inner housing 40 are both cup shaped. The assembly of the outer housing 22 and the inner housing 40 is sealed with a cover 48. The cover 48 has an opening 50 through which the rod 24 protrudes. Between a bottom 52 of the inner housing 40 and a fourth piston 54 serving as a bearing member is a cup spring 56 serving as a fifth spring of the pedal emulator 20. Between the fourth piston 54 and a bottom 58 of the outer housing 22 is a plate spring 60 serving as a sixth spring of the pedal emulator 20. The springs 34, 38, 42, 44, 56, 60 each have a linear spring characteristic. A seventh spring 62 comprises a rubber part with a progressive spring characteristic disposed between the first piston 28 and the damper 46.

A surface 64 of the friction element 30 establishes a frictional contact with an inner annular side surface 66 of the inner housing 40 to function as a hysteresis generation system. The hysteresis generating system generates frictional hysteresis in the current embodiment. This system includes two friction partners, namely, the friction element 30 and the inner housing 40, wherein the inner annular side surface 66 of the inner housing 40 and the outer annular side surface 64 of the friction element 30 slide over each other.

As shown in FIG. 2, the springs 34 and 42 and the springs 38 and 44 are each connected in series, with a first series circuit comprising the springs 34 and 42 and a second series circuit comprising the springs 38 and 44. The first and the second series circuit together form a parallel circuit with each other and with the damper 46 and with the friction-based hysteresis generating system. The springs 56 and 60 are connected in series both to each other and to the aforementioned parallel circuit.

By means of the friction-based hysteresis generating system of the present embodiment, there a dependency of the simulated haptic feedback achieved by the pedal emulator 20 upon the speed at which the control rod 24 is moved. Moreover, since two series of springs are used in the pedal emulator 20 as depicted in FIGS. 1-5, an advantageous functional redundancy is created ensuring that, for example, during a malfunction in one of the two series circuits of springs, the pedal will nevertheless still be moved in the direction of a rest position, which is shown in FIG. 2.

More specifically, the control rod 24 is biased in the rest position shown in FIG. 2 by means of the springs 34, 38, 42, 44, 56, 60. To generate a force required for the friction interaction to take place between the friction surfaces 64, 66 of the friction system, the first piston 28 and the friction element 30 have mutually corresponding bevels 68, 70 so that the total spring force is at least partially deflected by about 90°. As shown in FIG. 2, the first piston 28 includes a sloped bevel 68 with a surface that flares outwardly at approximately 45° as measured from the longitudinal axis of the pedal emulator 20. Similarly, the friction element 30 includes a sloped bevel 70 with a surface that flares outwardly at approximately 45° as measured from the longitudinal axis of the pedal emulator 20. Consequently, the bevels 68, 70 meet at a sloped interface of approximately 45°. The spring circuits urge the friction element 30 against sloped interface, which results in the friction surface 64 of the friction element 30 being biased radially outward against the friction surface 66 of the inner housing 40. In the rest position, the friction surfaces 64, 66 are pressed against each other and are in frictional engagement with one another.

For detecting the relative displacement of the control rod 24 with respect to the outer housing 22, the pedal emulator 20 includes a displacement sensor taking the form of an inductive sensor. The displacement sensor comprises a cursor 72 in combination with an electrical circuit board 74 and excitation and sensor coils (not shown). The cursor 72 is on the first piston 28 and the circuit board 74 is disposed on the outer housing 22. The pedal emulator 20 further includes a Hall Effect sensor comprising a magnet 76 disposed on the inside housing 40 and the circuit board 74 with an electrical circuit (not shown). The Hall Effect sensor is also a displacement sensor and detects the relative movement between the inner housing 40 and the outer housing 22 and determines therefrom a force transmitted from the control rod 24 to the base part 58. To facilitate better resolution of the force determined by means of the Hall Effect sensor, the fifth spring 56 has a smaller spring constant compared to the sixth spring 60 and thus a softer spring characteristic. Accordingly, the spring travel of the fifth spring 56 is greater relative to the travel of the sixth spring 60 in response to the same force. The displacement of the fifth spring 56 is limited by the inner housing 40 and the fourth piston 54 and the displacement of the sixth spring 60 is limited by the fourth piston 54 and the outer base part 58 of the outer housing 22.

In the following paragraphs, the pedal emulator 20 according to the first embodiment is explained in more detail with reference to FIGS. 2-6.

Figure 6:
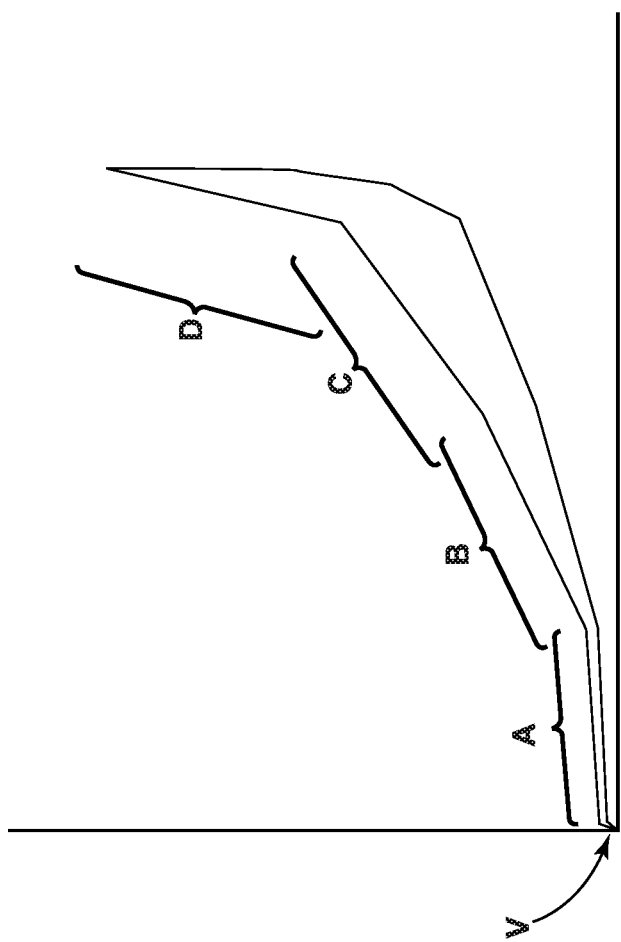
FIG. 6 is a force-displacement diagram of the embodiment of FIG. 1.

FIG. 2 shows the pedal emulator 20 in its rest position; that is, the position in which the pedal emulator 20 is mechanically connected to the footwell and the brake pedal but a user (a driver) has not depressed (actuated) the brake pedal. Due to the bias of the control rod 24 relative to the base part 58 of the pedal emulator 20, the user must first overcome an initial bias force A to actuate the brake pedal. This initial force, which corresponds to a displacement of the control rod 24, is depicted as the section marked "V" in FIG. 6. FIG. 6 shows the relative displacement of the control rod 24 with respect to the base part 58 on the X-axis and the operating force necessary to achieve a given displacement is shown on the Y-axis. The pedal displacement is measured by the inductive displacement sensor and the actuating force is measured by the Hall Effect force sensor. FIG. 6 additionally shows the force-displacement profile corresponding to both control rod 24 actuation (upper curve) and to the return of the control rod 24 from an actuated position back to the rest position (lower curve). In what follows, reference is made only to the upper curve of FIG. 6, and thus to the forces associated with actuation of the control rod 24 by the user.

Figure 3:
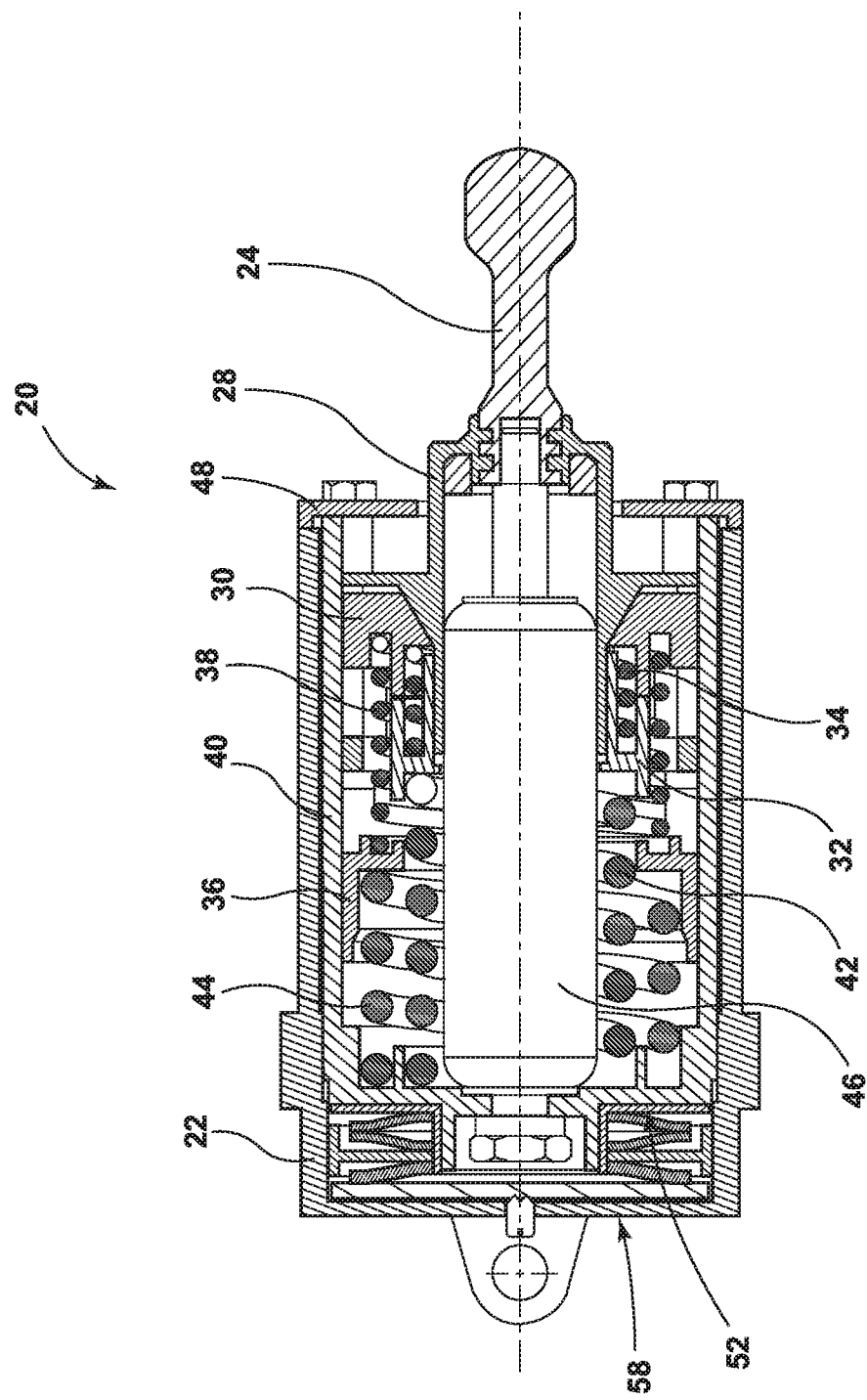
FIG. 3 is a cross-section of the pedal emulator of FIG. 1 in a first actuating position.

If, after overcoming the bias force, the user continues to exert more force on the brake pedal, the control rod 24 will continue to move in the direction of the base part 58. At this point in the displacement of the control rod 24, essentially only the first spring 34 and the second spring 38 are being compressed. "Essentially" because the other springs 42, 44, 56, 60 are also compressed to a certain extent, which is also the case for the processes described below. By continuing to compress the first spring 34 and the second spring 38, the first piston 28 approaches the second piston 32 and the friction element 30 is moved relative to the inner housing 40 resulting in friction between the two friction partners 64, 66. The forces and displacement corresponding to the compression of the first spring 34 and the second spring 38 correspond to "A" in FIG. 6. The compression of the first spring 34 is terminated when the friction element 30 contacts the second piston 32, as shown in FIG. 3. As an alternative, which is described below, the first piston 28 could be designed to serve as a bearing part for the first spring 34 and the second spring 38 rather than the friction element 30.

Figure 4:
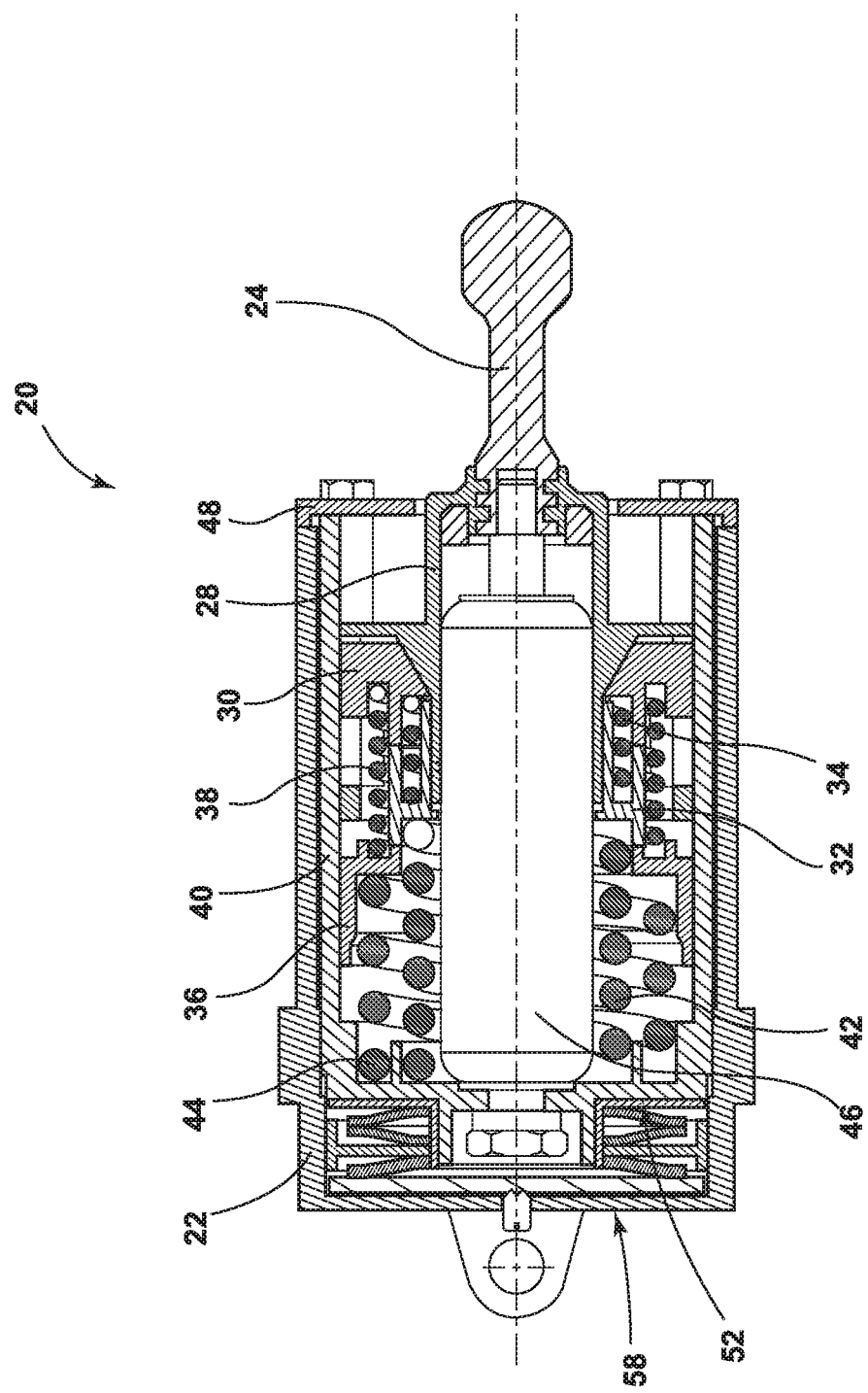
FIG. 4 is a cross-section of the pedal emulator of FIG. 1 in a second actuating position.
Figure 5:
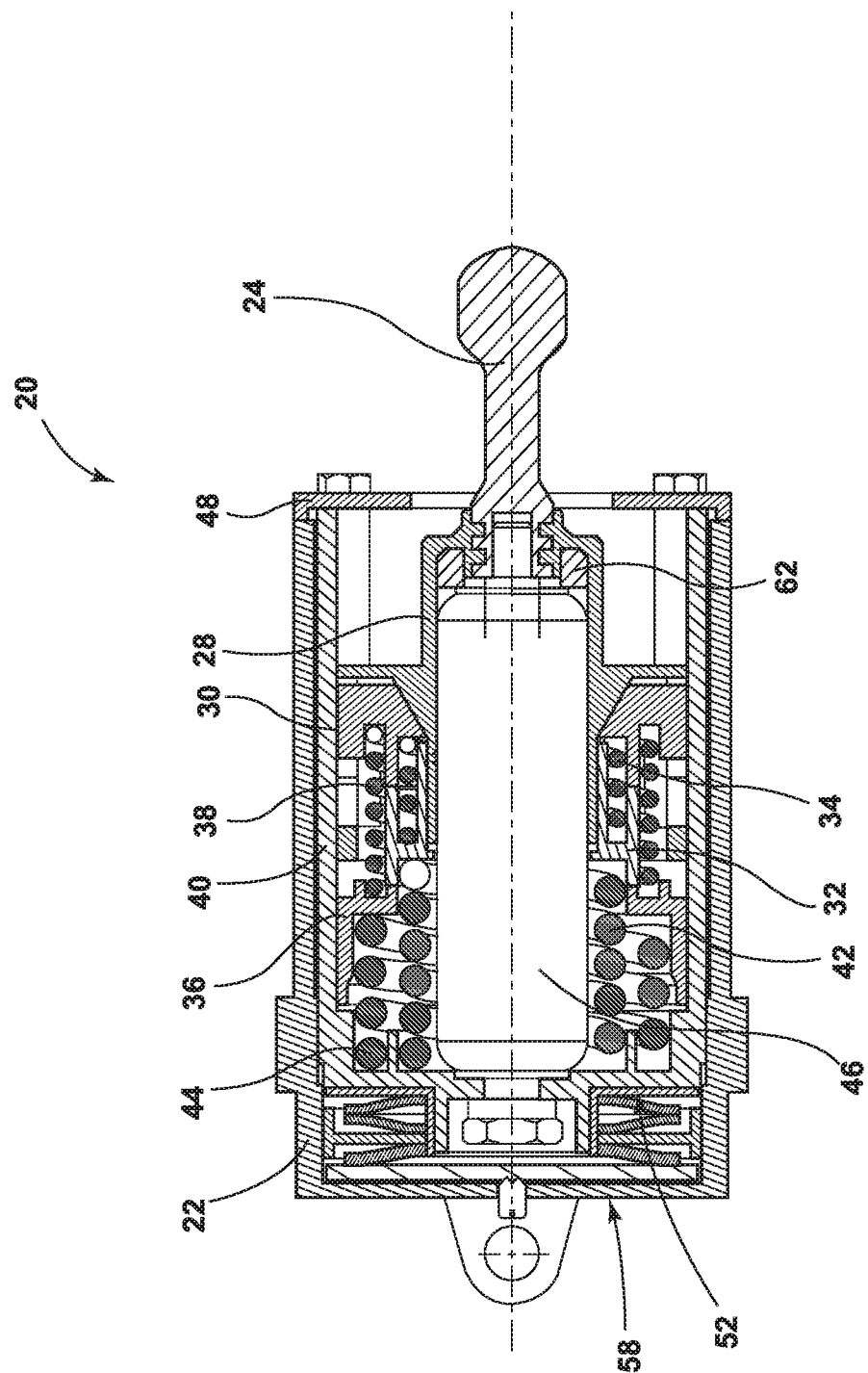
FIG. 5 is a cross-section of the pedal emulator of FIG. 1 in a third actuating position.

If the user continues to actuate the brake pedal, the control rod 24 will continue to be displaced in the direction of the base part 58, essentially compressing the second spring 38 and the third spring 42. See the corresponding section "B" in FIG. 6. Compression of the second spring 38 is completed when the second piston 32 contacts the third piston 36, as shown in FIG. 4. Upon further actuation of the brake pedal, thus further displacing the control rod 24 in the direction of the base part 58, the third spring 42 and the fourth spring 44 are essentially compressed. See the corresponding section "C" in FIG. 6. The compression of the third spring 42 and the fourth spring 44 is terminated when the third piston 36 is prevented by the inner housing 40 to move further in the direction of the base part 58, as shown in FIG. 5.

During the displacement described above of the control rod 24 in the direction of the base part 58, corresponding to the sections "V", "A", "B", and "C" in FIG. 6, the friction surfaces 64, 66 of the friction pair comprising the friction element 30 and the inner housing 40 engage each other. In addition, the aforementioned displacement of the control rod 24 takes place against a force exerted by the damper 46. Moreover, once the section "C" of FIG. 6 has been passed, the springs 34, 38, 42, 44 are not further compressed due to the above described limitations imposed on spring travel, and the damping path of the damper 46 is substantially traversed. However, further displacement of the brake pedal, corresponding to section "D" in FIG. 6, is possible through compression of the seventh spring 62 comprising a rubber part (see FIG. 5) that is disposed between the damper 46 and the first piston 28. The spring travel of the sensor springs 54, 56 is not considered in FIG. 6 because the spring travel of the sensor springs 54, 56 is approximately 2 mm, which is negligible compared to the total travel of the control rod 24, amounting to approximately 80 mm.

Figure 7:
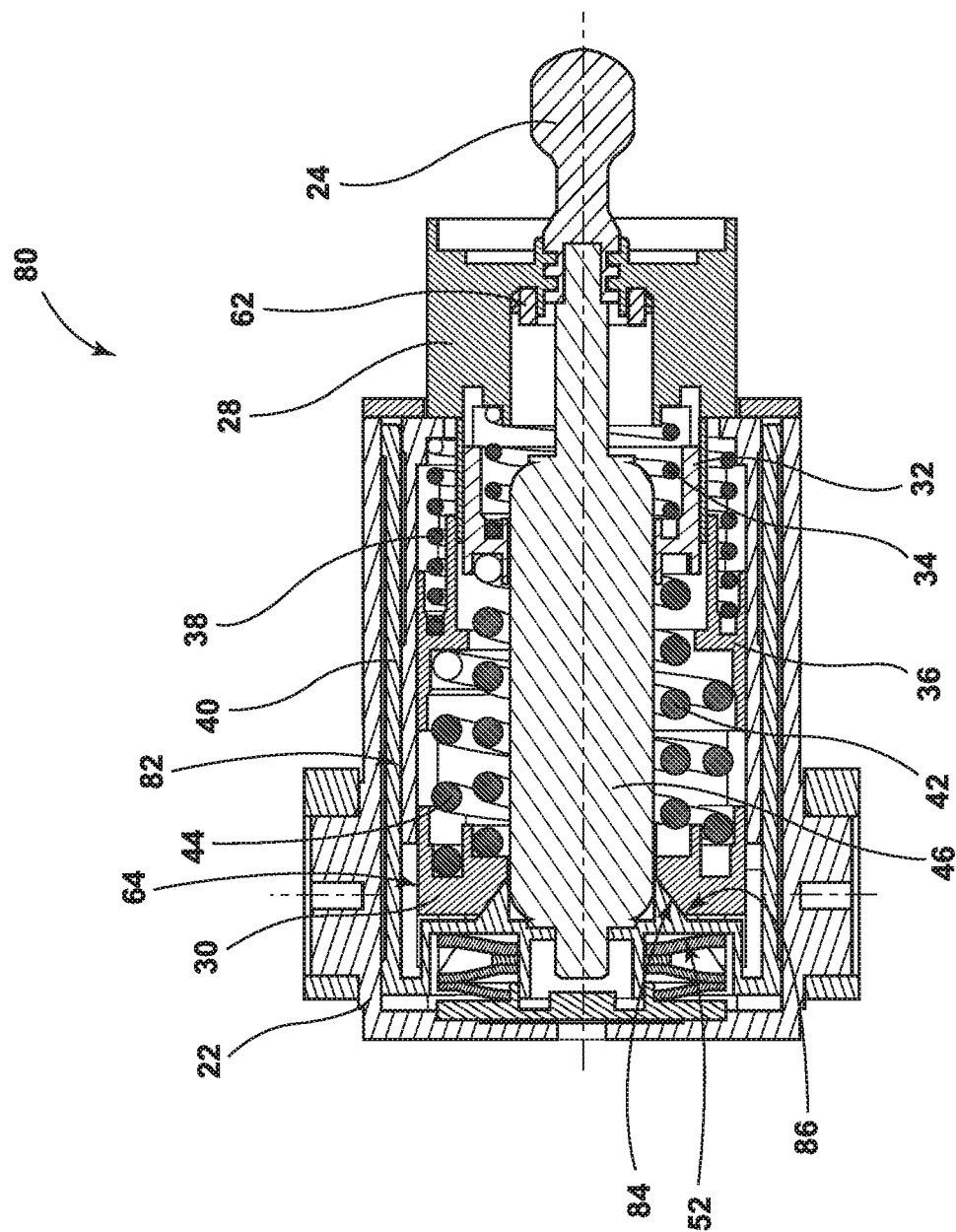
FIG. 7 is a cross-section of a pedal emulator in accordance with a second embodiment.

Referring now to FIG. 7, a brake pedal emulator in accordance with a second embodiment is illustrated and generally designated 80. The brake pedal emulator 80 is functionally and structurally similar to the brake pedal emulator 20 of FIGS. 1-5, except that the friction element 30 is positioned at the bottom of the inner housing 40.

More specifically, the hysteresis generating system of the brake pedal emulator 80 comprises a friction element 30 functioning as a bearing member and disposed adjacent to the bottom 52 of the inner housing 40. The friction system according to this embodiment has an advantage over that of the first embodiment of a larger effective friction surface. This is because a friction surface 82 of the first piston 28 frictionally engages with a friction surface 64 of the friction element 30. This frictional engagement further takes place in cooperation with the frictional engagement of a friction surface 82 of the first piston 28 (the outer annular surface of the piston 82) frictionally engaging a friction surface 66 of the inner housing 40 (the surface of the interior of the inner housing 40). For generating the normal force required to frictionally engage the individual friction surfaces with one another, the friction element 30 and the bottom 52 of the inner housing 40 have mutually corresponding beveled surfaces 84, 86. The first piston 28 functions as the first bearing part in the present embodiment of the brake pedal emulator 80.

Figure 8:
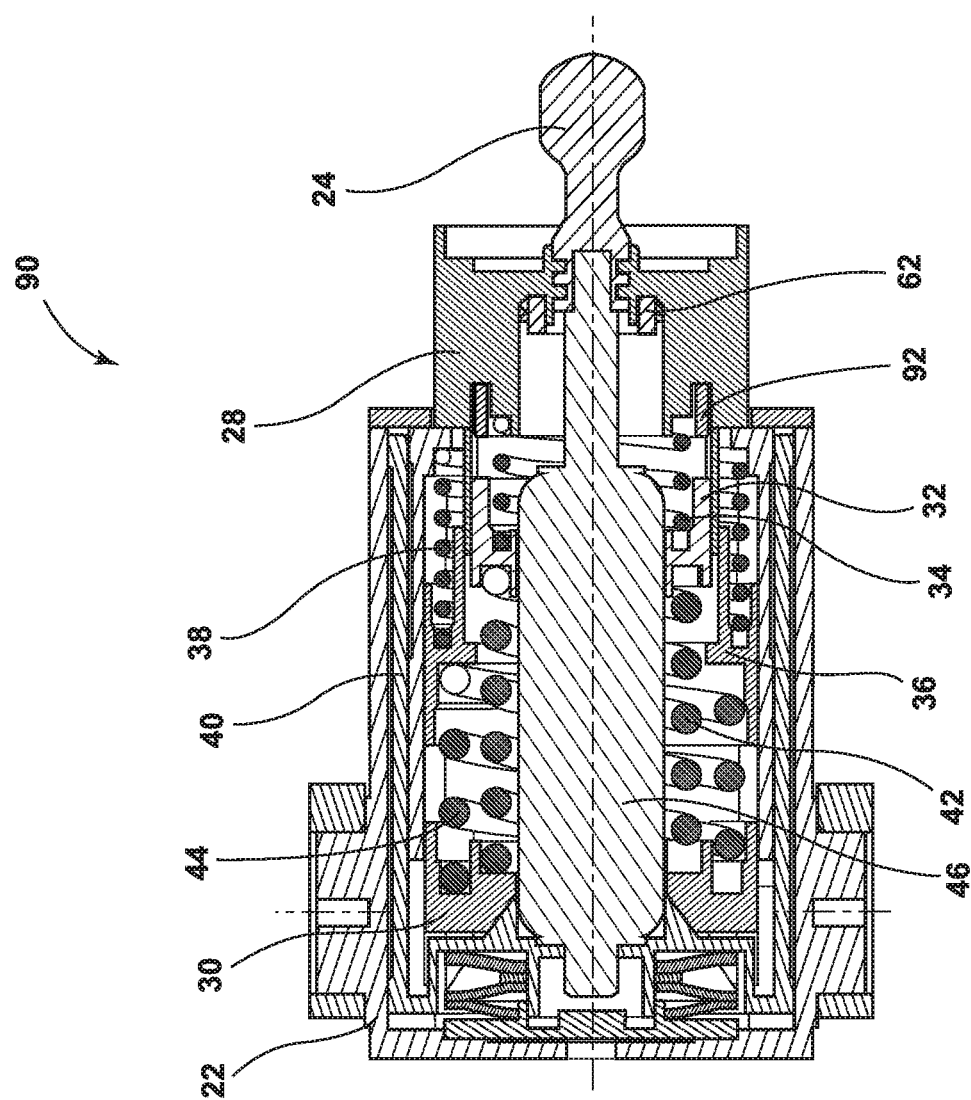
FIG. 8 is a cross-section of a pedal emulator in accordance with a third embodiment.
Figure 9:
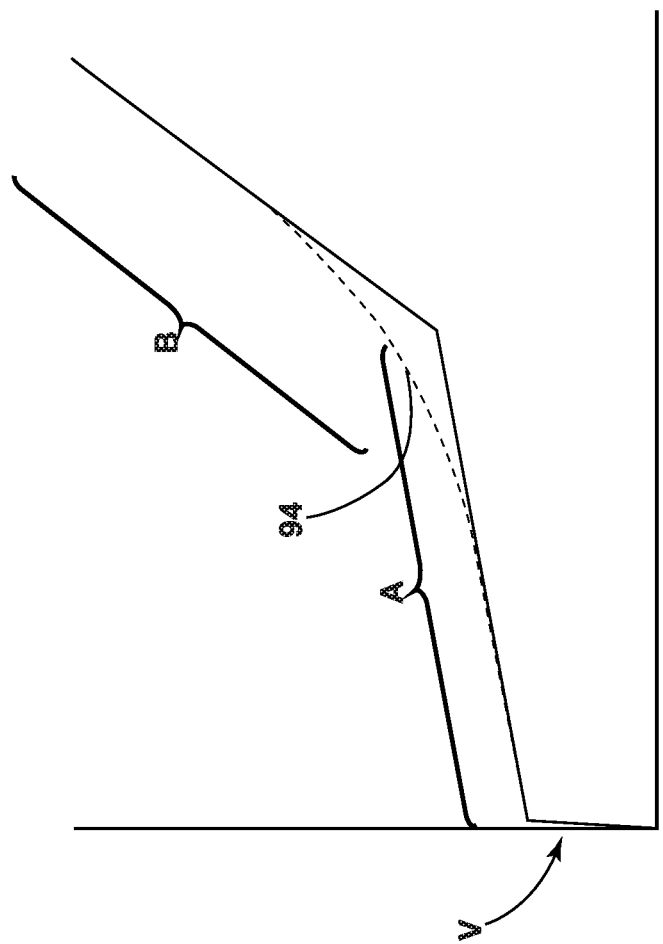
FIG. 9 is a force-displacement diagram corresponding to the embodiment of FIG. 8.

Referring now to FIG. 8, a brake pedal emulator in accordance with a third embodiment is illustrated and generally designated 90. The brake pedal emulator 90 is functionally and structurally similar to the brake pedal emulator of FIG. 7, except that disposed between the contact surfaces of the first piston 28 and the second piston 32 is an eighth spring 92 taking the form of a rubber part with a progressive spring characteristic. As can be seen from FIG. 8, this spring 92 has the effect that the transition from the portion "A" to the portion "B," in a representation analogous to FIG. 6, is made softer. The dashed line 94 in FIG. 9 illustrates the influence of the eighth spring 92 on the force-displacement curve of the control rod 44 of the brake pedal emulator 90 in comparison to a solid line representing a force-displacement curve of a control rod 44 of a brake pedal emulator lacking the eighth spring 92. Analogously, the other transitions between "V" and "A", "B" and "C", and "C" and "D" shown in FIG. 6 could be made softer by corresponding additional springs between the respective contact surfaces of the individual pistons 32, 36, the friction element 30, and the inner housing 40.

Figure 10:
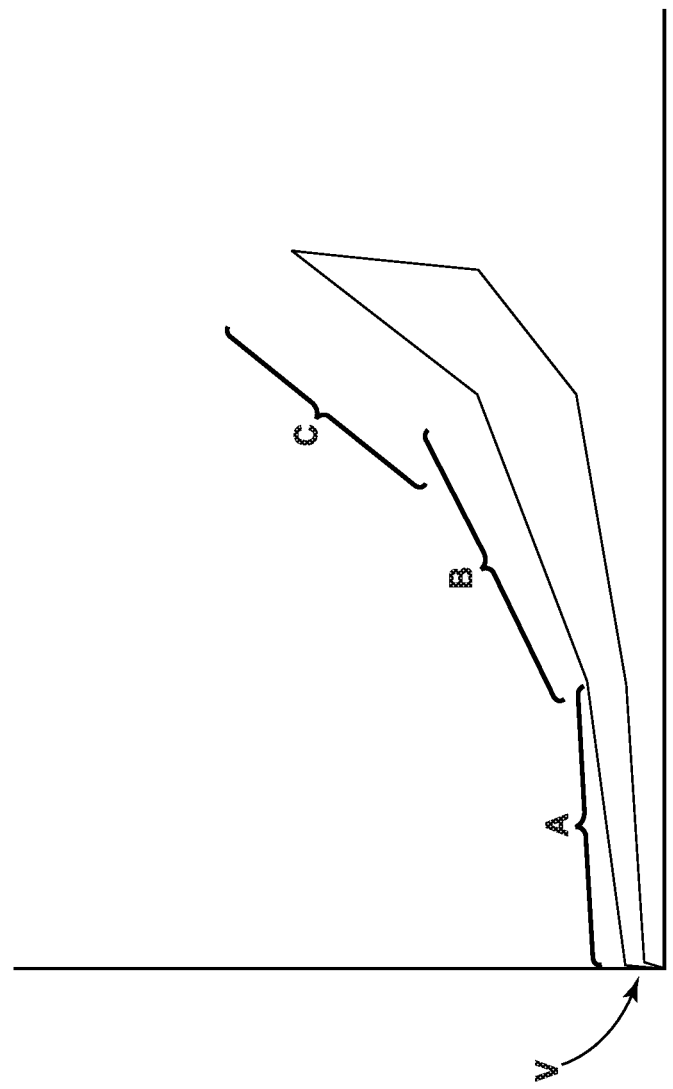
FIG. 10 is a force-displacement diagram corresponding to a fourth embodiment of a pedal emulator.
Figure 11:
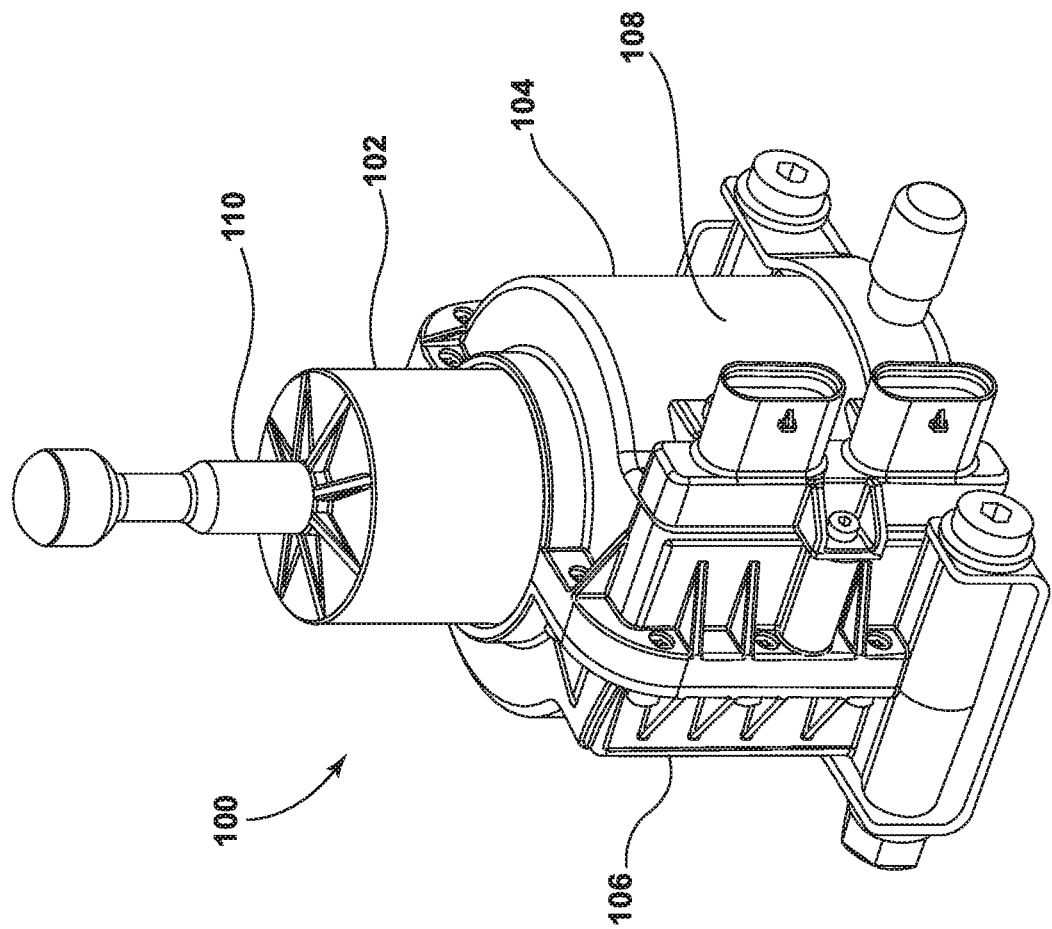
FIG. 11 is a perspective view of a pedal emulator in accordance with a fifth embodiment.

A fourth exemplary embodiment of a pedal emulator is described herein merely with reference to an exemplary force-displacement curve shown in FIG. 10 since it largely corresponds to the embodiment of FIGS. 1-6. As in the case of FIGS. 6 and 9, the relative displacement of the control rod 44 with respect to the base part 58 is plotted on the X-axis and the actuating force corresponding to each displacement position is plotted on the Y-axis. The pedal emulator according to the fourth embodiment differs from the second embodiment in that the fourth embodiment does not have a seventh spring 62. The section "D" of FIG. 7, which is based essentially on the action of the seventh spring 62 of the pedal emulator according to the first embodiment, is thus not found in FIG. 10. As mentioned above with respect to FIG. 6, the spring travel of the sensor springs 54, 56 is not taken into account in FIG. 10 since the spring travel of the sensor springs 54, 56 is only approximately 2 mm, which is negligible compared to the total travel of the control rod 24 amounting to approximately 80 mm. Similarly, the second and third embodiments of the pedal emulator 80, 90 can be modified so as not to include a seventh spring 62.

Referring to FIGS. 11-16, a brake pedal emulator in accordance with a fifth embodiment is illustrated and generally designated 100. The brake pedal emulator 100 includes a body having an emulator piston 102 extending through an opening in an emulator housing 104. The emulator housing 104 includes two halves 106, 108 that are secured together to define an internal chamber. In other embodiments, the emulator housing 104 includes a unitary construction. An input rod 110 is fixedly attached to the emulator piston 102, such that downward travel of the input rod 100—typically in response to depression of a brake pedal—results in downward travel of the emulator piston 102 into the internal chamber. As generally set forth below, downward travel of the emulator piston 102 is measured by one or more sensors and is opposed by counter-force.

Figure 12:
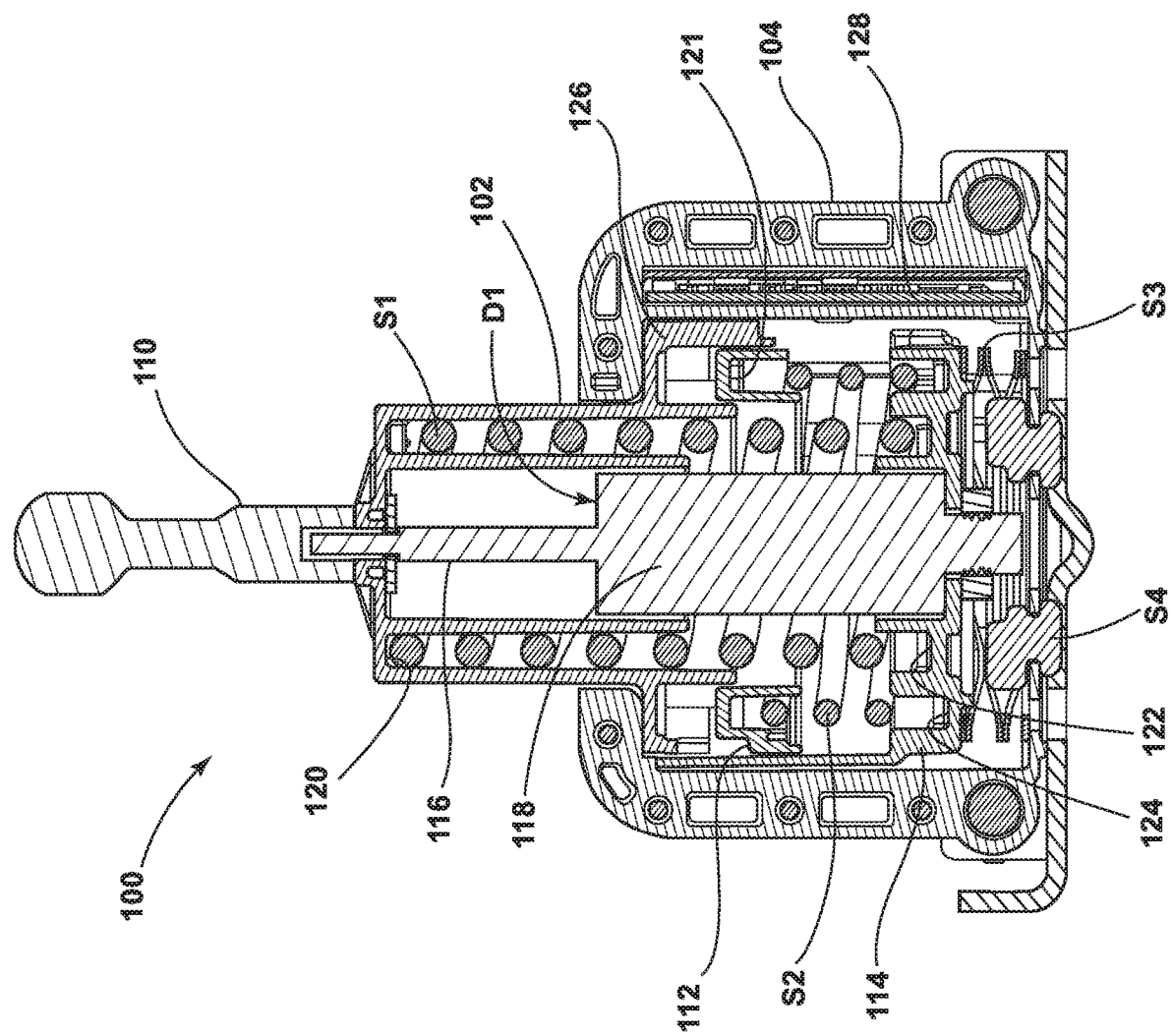
FIG. 12 is a cross-section of the pedal emulator of FIG. 11.

Referring now to FIG. 12, the brake pedal emulator 10 includes a damper D1, a first spring S1, a second spring S2, a third spring S3, a fourth spring S4, an intermediate spring seat 112, and a lower spring seat 114. The damper D1 includes a damper shaft 116 that is moveable in relation to a damper body 118. The damper body 118 is fixedly attached to the lower spring seat 114 and provides hysteresis during return travel of the input rod 110. The first spring S1 is a coil spring in the illustrated embodiment, but can be a wave spring in other embodiments. The coil spring or the wave spring can be linear or progressive, and optionally a dual-rate coil spring, and further optionally a progressive coil spring. Similarly, the second spring S2 is a coil spring in the illustrated embodiment, but can be a wave spring. The first and second coil springs S1, S2 are concentrically arranged about the damper D1 and bear against the lower spring seat 114. The fourth spring S4 is an elastomeric bumper in the illustrated embodiment but can be a coil spring or a wave spring in other embodiments. The fourth spring S4 provides a further counter-force to the emulator piston 102, intermediate spring seat 112, and lower spring seat 114, and consequently the input rod 110, depending on the amount of travel as discussed below.

Referring again to FIG. 12, the first coil spring S1 is carried between an annular channel 120 of the emulator piston 102 and an inner annular channel 122 of the lower spring seat 114. Similarly, the second coil spring S2 is carried between an annular channel 121 of an intermediate spring seat 112 and an outer annular channel 124 of the lower spring seat 114. The emulator piston 102 further includes an annular flange 126 adapted to bear against an intermediate spring seat 112. Downward travel of the emulator piston 102 causes the annular flange 126 to engage the intermediate spring seat 112, which causes the second spring S2 to contribute to the counter-force of the brake pedal emulator 100 as set forth in greater detail below.

As noted above, the brake pedal emulator 100 includes one or more sensors to measure the position of the emulator piston 102, and consequently the brake pedal travel. The brake pedal emulator 100 is electrically connected to an external voltage source and ground in the current embodiment, while in other embodiments the brake pedal emulator 100 is powered by a power supply contained within the emulator housing 104. In the current embodiment, the brake pedal emulator 100 includes a non-contact inductive position sensor, for example a CIPOS® by Hella GmbH & Co. KGaA. The non-contact inductive position sensor includes an excitation coil disposed on a PCB 128 contained within the emulator housing 104 and includes a cursor target affixed to the emulator piston 102, and in particular the annular flange 126. The non-contact inductive position sensor provides an output, for example an analog output, a pulse-width-modulated output, or a SENT protocol output, which is based on the position of the cursor target relative to the excitation coil. This output is provided to a brake-by-wire electronic control unit (ECU) for conversion into a braking demand. The brake pedal emulator 100 additionally includes a non-contact force sensor, for example a Hall Effect sensor, affixed to the lower spring seat 114. Movement of the lower spring seat 114 relative to the PCB 128 is detected by the Hall Effect sensor and converted into a force value for output to the brake-by-wire ECU. In this respect, the brake pedal emulator 100 provides displacement and force outputs for a brake-by-wire ECU for conversion into a braking demand. Though two sensors are described in the current embodiment, greater or fewer sensors can be implemented in other embodiments as desired.

The brake pedal emulator 100 provides a counter-force when actuated by a brake pedal during a braking event. The counter-force varies with respect to travel of the input rod 110, such that the counter-force mimics that of a conventional brake pedal. In particular, the counter-force according to the current embodiment exhibits two inflection points, such that the rate of change of the counter-force varies non-linearly through full compression of the emulator piston 102, followed by damper hysteresis to slow the return of the emulator piston 102. This counter-force generally includes three stages: a first force response, a second force response, and a third force response. As used herein, the term "force response" means the cumulative counter-force applied to the emulator piston 102 through a given amount of travel, which is also the work applied to the emulator piston 102 to achieve that amount of travel. The first stage force response is provided by the first spring S1 in parallel with the damper D1, which are in series with the third spring S3. The second stage force response is provided by the first spring S1 in parallel with the second spring S2 in parallel with the damper D1, which are in series with the third spring S3. The third stage force response is provided by the first spring S1 in parallel with the second spring S2 in parallel with the damper D1, which are in series with the third spring S3 in parallel with the fourth spring S4.

Figure 13:
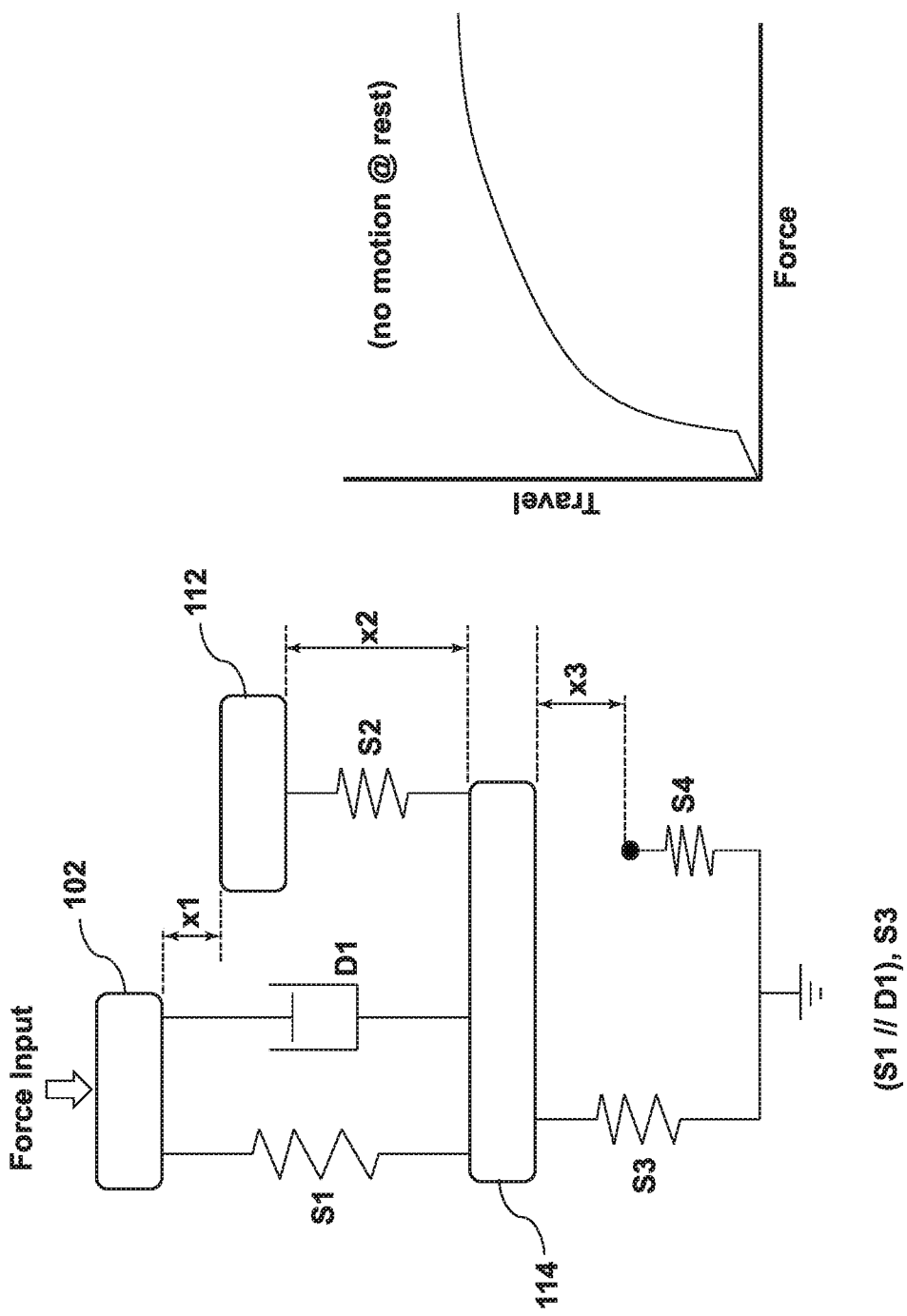
FIG. 13 includes a spring diagram and travel-force curve in the absence of a compression force.
Figure 14:
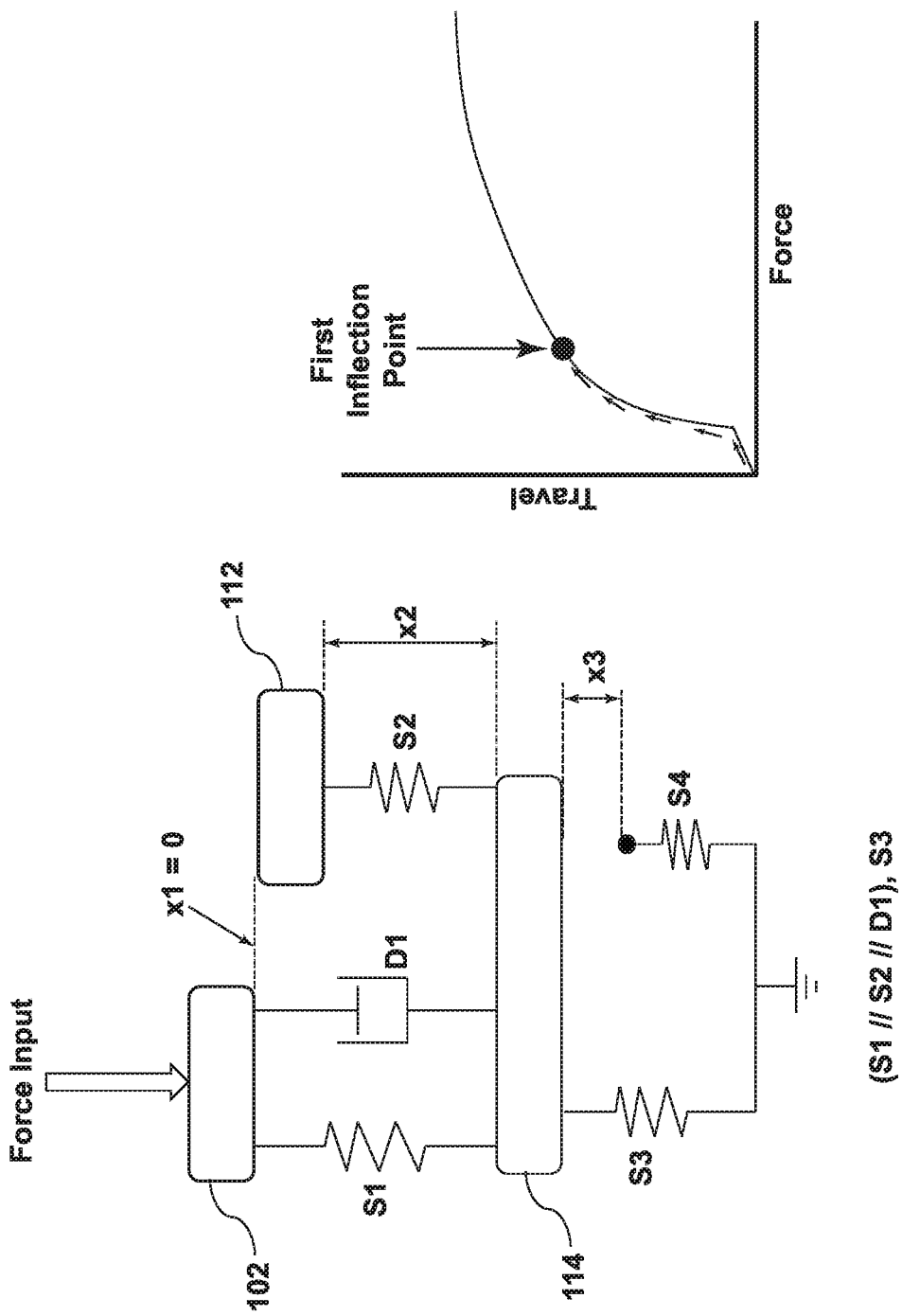
FIG. 14 includes a spring diagram and travel-force curve depicting travel to the first inflection point.
Figure 15:
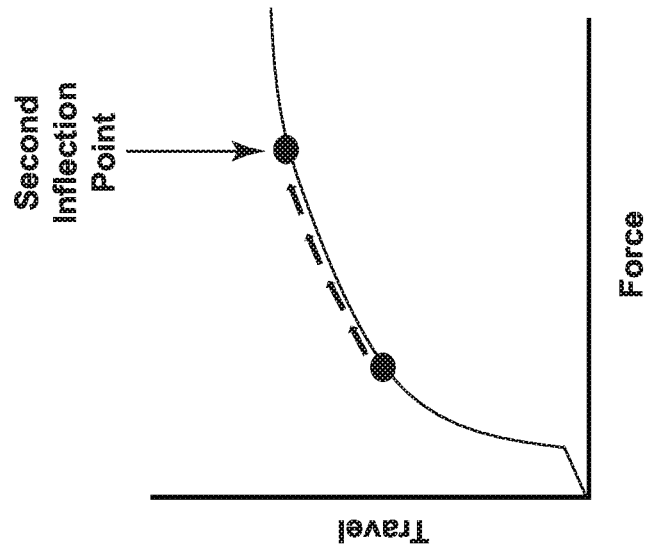
FIG. 15 includes a spring diagram and travel-force curve depicting travel from the first inflection point to the second inflection point.
Figure 15:
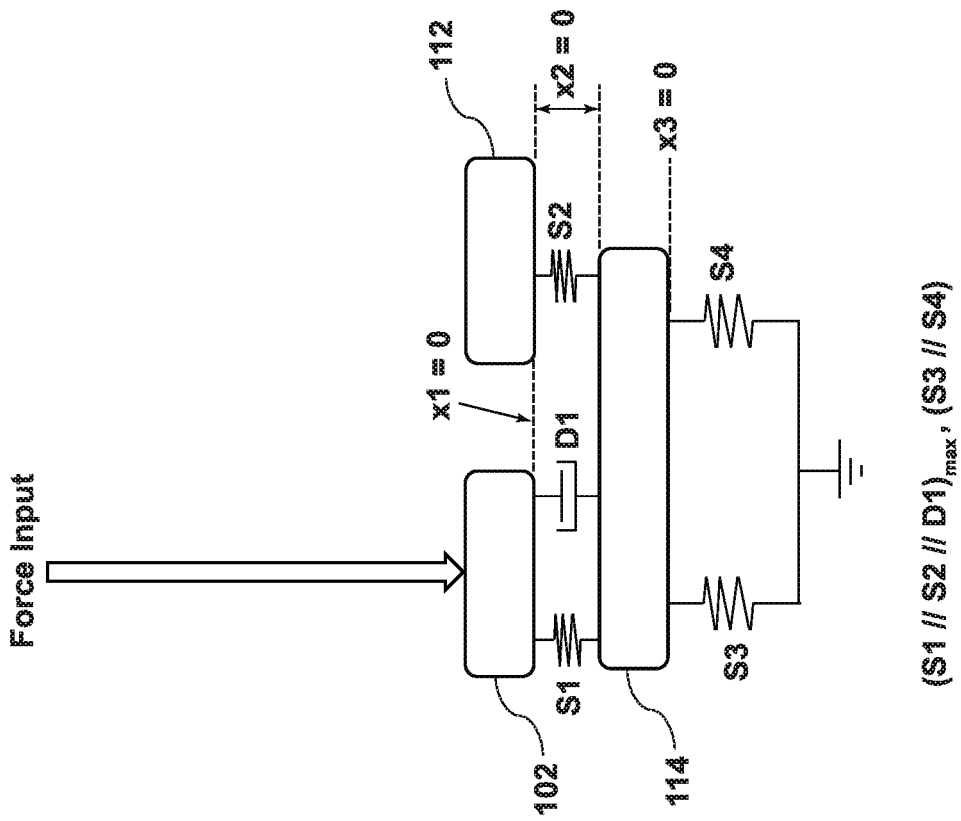
Figure 16:
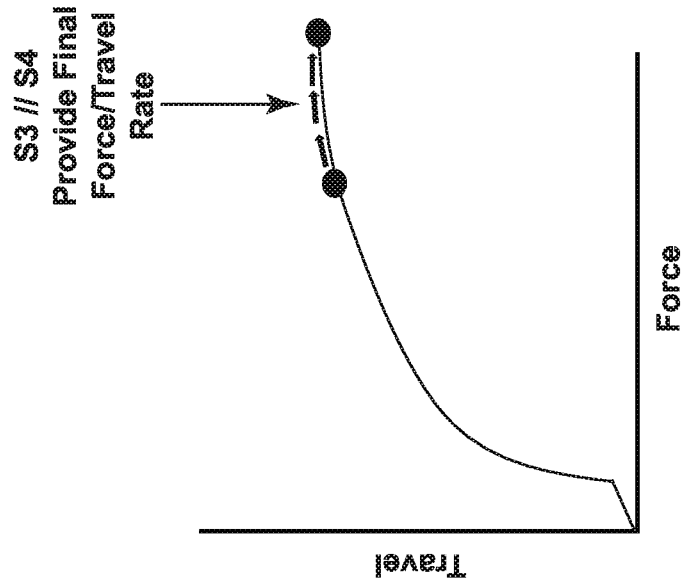
FIG. 16 includes a spring diagram and travel-force curve depicting travel from the second inflection point to the end position.
Figure 16:
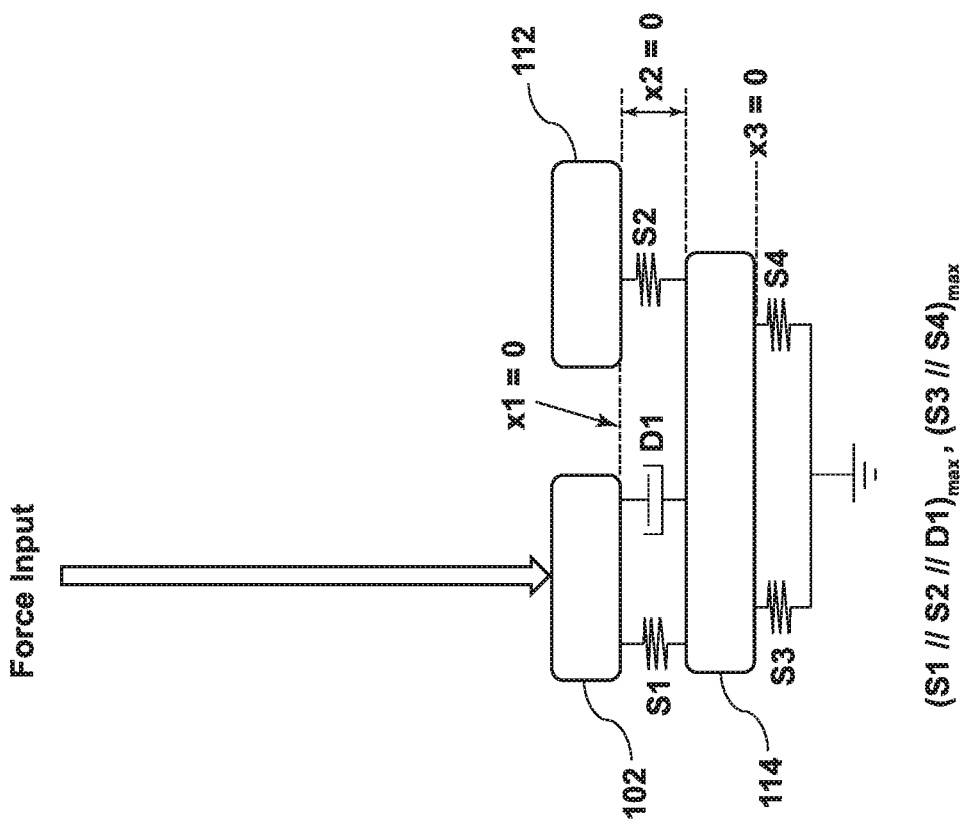

Each stage is discussed below in connection with FIGS. 13 through 16, in which a force input is depicted, the force input being equal to the counter-force. Travel-force curves are also depicted, in which the downward travel of the emulator piston 102 is plotted against the force input (or the counter-force). In particular, FIG. 13 illustrates a state of rest, in which no force input is applied to the input rod 110, and consequently no counter-force is provided. FIG. 14 illustrates a first stage force response curve, FIG. 15 illustrates a second stage force response curve, and FIG. 16 illustrates a third stage counter-force curve, each being in response to a gradually increasing force input on the input rod 110. In addition, distance x1 is the distance separating the annular flange 126 of the emulator piston 102 and the intermediate spring seat 112, distance x2 is the distance separating the intermediate spring seat 112 from the lower spring seat 114, and distance x3 is the distance separating the lower spring seat 114 from the elastomeric bumper S4.

Referring now to FIG. 13, no force input is applied, and the brake pedal emulator 100 is at a state of rest. The emulator piston 102 is upwardly biased by the first spring S1 in series with the third spring S3, and each of distance x1, x2, and x3 are at their maximum.

Referring now to FIG. 14, a force input results in a first stage counter-force. The first stage counter-force increases with the downward travel of the emulator piston 102. This downward travel is opposed by the first spring S1 in series with the wave spring S3. In addition, the damper D1 contributes a resistive force upon the emulator piston 102, the damper D1 operating in parallel with the first coil spring S1. Once distance x1 reaches zero (i.e., once the emulator piston 102 contacts the intermediate spring seat 112), the counter-force reaches a first inflection point, at which point the second coil spring S2 is engaged. The first stage counter-force is therefore dependent upon the position of the emulator piston 102 and is dependent upon the spring constants of the respective springs S1 and S3 and damper D1.

Referring now to FIG. 15, a continued force input results in a second stage counter-force. The second stage counter-force increases with the downward travel of the emulator piston 102, but at a faster force rate (force per unit travel) than with the first stage counter-force. This downward travel is opposed by the first spring S1 in parallel with the second spring S2 and in series with the third spring S3. In addition, the damper D1 again contributes a resistive force upon the emulator piston 102, the damper D1 operating in parallel with the first spring S1 and second spring S2. The counter-force is therefore dependent upon the spring constants of the respective springs S1, S2 and S3 and dependent upon the damper D1. Once distance x2 reaches zero (i.e., once the intermediate spring seat 112 contacts the lower spring seat 114) and distance x3 reaches zero (i.e., once the lower spring seat 114 contacts the fourth spring S4), the counter-force reaches a second inflection point, at which point the fourth spring S4 is engaged.

Referring now to FIG. 16, a continued force input results in a third stage counter-force. During this third stage, a continued force input results in only marginal downward travel of the emulator piston 102. The first spring S1, the second spring S2, and the damper D1 are at their maximum compression, and downward travel is opposed by the third spring S3 in parallel with the fourth spring S4. Consequently, the final force/travel rate is a function of the third spring S3 in parallel with the fourth spring S4.

When the force input is reduced, the emulator piston 102 travels upwardly until the counter-force equals the reduced force input, at which point the system is again in equilibrium. If the force input is reduced to zero, for example if the driver releases the brake pedal, the emulator piston 102 travels upwardly until the counter-force is zero, i.e., the emulator piston 102 is fully extended to an "at rest" position. During this return, the damper D1 provides hysteresis in response to relative movement of the damper shaft 116 with respect to damper body 118. The damper D1 is provided with a compact size in order to meet packaging requirements in some embodiments, while also being sufficiently robust to provide the desired hysteresis.

In use, the emulator housing 104 is mounted to a vehicle panel, for example a footwell panel, and the input rod 110 is mounted to a pedal arm. A brake pedal pad is joined to the pedal arm, such that downward deflection of the brake pedal pad causes a corresponding downward deflection of the emulator piston 102 (via input rod 110). Downward deflection of the emulator piston 102 is measured by the brake emulator 100 in the manner set forth above and converted into a braking demand by the brake-by-wire ECU.

In some embodiments, a haptic actuator provides vibratory feedback to the brake pedal pad. The haptic actuator can be incorporated into the brake pedal emulator 100 or can be external to the brake pedal emulator 100. For example, the haptic actuator can be mounted to the brake pedal arm or mounted to the underside of the brake pedal pad. Haptic information is provided to the driver in the form of one or more vibrations or pulses, the haptic information relating to a vehicle operating state. For example, the haptic actuator can impart a first vibration or pulse on the brake pedal arm or brake pedal pad in response to activation of an electric motor to simulate the starting of an internal combustion engine. Further by example, the haptic actuator can impart a second vibration or pulse (different from the first vibration or pulse) on the brake pedal arm or brake pedal pad to simulate engagement of vehicle anti-lock brakes.

The foregoing examples of haptic information relating to a vehicle operating state are not exhaustive, and further haptic information can be provided in other embodiments as desired. In addition, the brake pedal emulator 100 can be used to receive information from the driver, separate and apart from the desired braking demand. For example, a first number of actuations of the brake pedal pad by the driver during a vehicle non-operating state can be converted into an engine/motor start command by the brake pedal emulator 100 or by the brake-by-wire ECU. Further by example, a second number of actuations of the brake pedal by the driver during a vehicle non-operating state can be converted by the brake pedal emulator 100 or by the brake-by-wire ECU into a transmission shift command (e.g., shift from park to neutral). Acknowledgment of these commands can be confirmed with a haptic vibration of the pedal arm or brake pedal pad. For example, the haptic actuator can provide a first series of pulses in response to the engine/motor start command and can provide a second series of pulses in response to the transmission shift command, the first series of pulses being different from the second series of pulses. Also by example, the haptic actuator can provide a first vibration in response to the engine/motor start command and can provide a second vibration in response to the transmission shift command, the first vibration being different from the vibration, for example, having a different frequency, intensity, duration, or combinations thereof.

As noted above, the one or more sensors are powered by a power supply contained within the emulator housing 104. The power supply can additionally provide electrical power to the haptic actuator. The power supply is rechargeable in the current embodiment, optionally drawing power from the vehicle electrical system. Further optionally, the power supply draws power from a regenerative power supply, for example a regenerative power supply that generates electrical power with each compression of the emulator piston 102. In other embodiments the brake pedal emulator 100 draws power directly from the vehicle electrical system.

Accordingly, a method for operating a vehicle using a pedal emulator 100 is provided. The method includes providing a brake pedal emulator 100 including an emulator piston 102, the emulator piston 102 being operatively coupled to a brake pedal. The brake pedal emulator 100 is adapted to provide a first force response during a first portion of travel of the emulator piston, a second force response during a second portion of travel of the emulator piston, and a third force response during a third portion of travel of the emulator piston. The method further includes detecting a series of actuations of the brake pedal using the pedal emulator 100 and detecting a vehicle operating state, e.g., the vehicle engine and/or motor is off, the vehicle engine and/or motor is off and the vehicle is in park, or the vehicle engine and/or motor is on and the vehicle is in park. The series of actuations can include a plurality of actuations of the brake pedal (or other pedal) in quick succession. The method then includes correlating the detected series of actuations, and the vehicle operating state, into a driver input command, for example a transmission shift command, an engine start command, or a motor start command. The method further optionally includes providing vibratory feedback to the brake pedal using a haptic actuator, the vibratory feedback being in response to the detected series of actuations of the emulator piston 102 during a given vehicle operating state, for example the number of actuations within a predetermined time period (e.g., three actuations within five seconds) when the vehicle is in park. The vibratory feedback varies in accordance with the driver input command. For example, the vibratory feedback can include a first frequency or intensity to provide confirmation of a first driver input command and a second frequency or intensity to provide confirmation of a second driver input command. The method can further include converting kinetic energy from the actuations of the emulator piston into electrical power, stored to a battery, for operation of the haptic actuator and/or the brake pedal emulator 100.

To reiterate, the present embodiment includes an improved brake pedal emulator 100 for a brake-by-wire system. The brake pedal emulator 100 includes a damper D1 surrounded by first and second springs S1, S2 that are carried by a lower spring seat 114, the lower spring seat 114 being upwardly biased by a third spring S3 and a fourth spring S4. The first, second, third, and fourth springs S1, S2, S3, S4 provide a counter-force to the emulator piston 102, the counter-force including multiple stages. The internal damper D1 provides a desired hysteresis during return travel of the emulator piston 102, and non-contact sensors measure position and force through a full range of motion of the emulator piston 102. The brake pedal emulator 100 is operable to detect the position of the brake pedal for conversion into a braking demand. Haptic feedback is also provided, and the brake pedal emulator 100 includes an on-board power supply such that the brake pedal emulator 100 can receive driver commands, e.g., vehicle start, before the vehicle is operating.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A pedal emulator for a motor vehicle comprising:
an outer housing defining a central opening;

an emulator piston extending through the central opening and being movable through a range of motion, the emulator piston including a beveled surface encircling a radially-outward facing portion thereof;
a spring seat within the outer housing, the spring seat including a beveled surface encircling a radially-inward facing portion thereof, the beveled surface of the spring seat being in engagement with the beveled surface of the emulator piston, such that the emulator piston and the spring seat include mutually corresponding friction surfaces of a hysteresis generating system;
a damper operatively coupled to the emulator piston;
a first spring disposed concentrically around the damper and being constrained on opposing axial ends thereof between the spring seat and a second piston throughout the full range of motion of the emulator piston;
a second spring disposed concentrically around the first spring and constrained on opposing axial ends thereof between the spring seat and a third piston, wherein the first spring, the second spring, and the damper are connected in parallel to collectively resist movement of the emulator piston into the outer housing;
a third spring connected in series with the first spring, the second spring, and the damper, wherein the first and second springs are coil springs and wherein the pedal emulator is adapted to provide a first force response during a first portion of travel of the emulator piston, a second force response during a second portion of travel of the emulator piston, and a third force response during a third portion of travel of the emulator piston;
wherein a radially-outward facing portion of the spring seat establishes frictional contact with an inner housing, the inner housing being movable relative to the outer housing.

2. The pedal emulator of claim 1 wherein the third spring is a wave spring.

3. The pedal emulator of claim 1 further including an elastomeric spring element in series with the damper.

4. The pedal emulator of claim 1 further including a non-contact position sensor within the outer housing to detect movement of the emulator piston.

5. The pedal emulator of claim 1 further including a non-contact force sensor within the outer housing to detect a force input applied to the emulator piston.

6. The pedal emulator of claim 1 further comprising:
a control rod attached to the emulator piston for mounting the pedal emulator to a vehicle pedal, wherein the control rod is moveable with respect to the outer housing; and
a parallel circuit within the outer housing, the parallel circuit including the first spring in series with a fourth spring as a first series circuit to oppose movement of the control rod into the outer housing, the first and fourth springs being coil springs, the parallel circuit further including the damper connected in parallel with the first series circuit and the hysteresis generating system.

7. The pedal emulator according to claim 6, wherein the parallel circuit includes a second series circuit of at least two springs, the second series circuit being connected in parallel with the first series circuit, the damper, and the hysteresis generating system.

8. The pedal emulator according to claim 7, wherein the springs of the first series circuit and the springs of the second series circuit bias the control rod in a rest position of the pedal emulator.

9. The pedal emulator according to claim 7, wherein the springs of the first series circuit and the springs of the second series circuit at least partially each have a linear spring characteristic or a progressive spring characteristic.

10. The pedal emulator according to claim 7, wherein each spring of the first series circuit is arranged in a force-transmitting manner between two bearing parts which correspond to one another and which guide the spring travel of the spring limit.

11. The pedal emulator according to claim 10, further including an elastomeric spring element having a progressive spring characteristic and is positioned to be compressed when engaged by the damper.

12. The pedal emulator according to claim 6, wherein the hysteresis generating system is a friction system with at least two frictionally engaged friction partners.

13. The pedal emulator according to claim 12, wherein the friction system is pre-tensioned in the rest position of the pedal emulator such that the mutually corresponding friction surfaces are pressed against each other.

14. The pedal emulator according to claim 13, wherein the mutually corresponding friction surfaces of the friction partners are parallel to the direction of the spring force of the springs of the first series connection and wherein the corresponding spring force is deflected by 90° to urge the friction partners against each other.

15. The pedal emulator according to claim 6, further including a displacement sensor for detecting the relative movement between the outer housing and the control rod.

16. The pedal emulator according to claim 6, wherein the pedal emulator includes a force sensor for detecting the force applied to the control rod.

* * * * *